United States Patent
Levy et al.

(10) Patent No.: US 8,250,660 B2
(45) Date of Patent: Aug. 21, 2012

(54) DIGITAL WATERMARKING APPLICATIONS

(75) Inventors: Kenneth L. Levy, Stevenson, WA (US); Reed R. Stager, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/567,128

(22) Filed: Dec. 5, 2006

(65) Prior Publication Data
US 2007/0098172 A1   May 3, 2007

Related U.S. Application Data

(62) Division of application No. 10/622,079, filed on Jul. 16, 2003.

(60) Provisional application No. 60/396,893, filed on Jul. 16, 2002.

(51) Int. Cl.
*H04L 29/06* (2006.01)

(52) U.S. Cl. .......... 726/26; 713/182; 713/176; 382/100

(58) Field of Classification Search .................. None
See application file for complete search history.

(56) References Cited

U.S. PATENT DOCUMENTS

| | | |
|---|---|---|
| 4,977,594 A | 12/1990 | Shear |
| 4,979,210 A | 12/1990 | Nagata et al. |
| 5,079,648 A | 1/1992 | Maufe |
| 5,612,943 A | 3/1997 | Moses et al. |
| 5,613,004 A | 3/1997 | Cooperman et al. |
| 5,721,788 A | 2/1998 | Powell et al. |
| 5,748,763 A | 5/1998 | Rhoads |
| 5,765,152 A | 6/1998 | Erickson |
| 5,768,426 A | 6/1998 | Rhoads |
| 5,825,892 A | 10/1998 | Braudaway et al. |
| 5,832,119 A | 11/1998 | Rhoads |
| 5,845,281 A | 12/1998 | Benson et al. |
| 5,862,260 A | 1/1999 | Rhoads |
| 5,910,987 A | 6/1999 | Ginter et al. |
| 5,915,019 A | 6/1999 | Ginter et al. |
| 5,943,422 A | 8/1999 | Van Wie et al. |
| 5,949,055 A | 9/1999 | Fleet et al. |
| 5,982,956 A | 11/1999 | Lahmi |
| 5,991,876 A | 11/1999 | Johnson et al. |
| 6,112,181 A | 8/2000 | Shear et al. |
| 6,122,403 A | 9/2000 | Rhoads |
| 6,163,842 A | 12/2000 | Barton |
| 6,182,218 B1 | 1/2001 | Saito |

(Continued)

OTHER PUBLICATIONS

J. Zhao, "A www service to embed and prove digital copyright watermarks", 1996, Proc. Of the European Conference on Multimedia Application, Services and Techniques, http://www.crcg.edu/Staff/jzhao/pubs/ecmast96.ps, p. 1-15.*

(Continued)

*Primary Examiner* — Eleni Shiferaw
*Assistant Examiner* — Jeffery Williams
(74) *Attorney, Agent, or Firm* — Digimarc Corporation

(57) ABSTRACT

Methods and systems include, e.g.,: (1) steganographically embedding location information in images, where the location information is obtained from remote sources like a cell phone network or remote GPS receiver; (2) steganographically embedding participant IDs in content to ensure proper billing and royalty tracking; (3) providing fair-use content management based upon digital watermark-tracked usage; (4) providing micro-payments based upon watermarked ID cards for retailers; and/or (5) providing watermarked logon cards, such as watermarked hotel room keys, to better provide internet logon access control. Other systems and methods are provided as well.

14 Claims, 2 Drawing Sheets

U.S. PATENT DOCUMENTS

| | | | |
|---|---|---|---|
| 6,233,684 B1 | 5/2001 | Stefik et al. | |
| 6,236,971 B1 | 5/2001 | Stefik et al. | |
| 6,266,419 B1 | 7/2001 | Lacy et al. | |
| 6,278,792 B1 | 8/2001 | Cox et al. | |
| 6,307,949 B1 | 10/2001 | Rhoads | |
| 6,330,335 B1 | 12/2001 | Rhoads | |
| 6,332,194 B1 | 12/2001 | Bloom et al. | |
| 6,374,036 B1 | 4/2002 | Ryan et al. | |
| 6,404,898 B1 | 6/2002 | Rhoads | |
| 6,408,082 B1 | 6/2002 | Rhoads et al. | |
| 6,411,392 B1 | 6/2002 | Bender et al. | |
| 6,470,090 B2 | 10/2002 | Oami et al. | |
| 6,560,349 B1 | 5/2003 | Rhoads | |
| 6,571,220 B1 | 5/2003 | Ogino et al. | |
| 6,590,996 B1 | 7/2003 | Reed et al. | |
| 6,614,914 B1 | 9/2003 | Rhoads et al. | |
| 6,700,995 B2 | 3/2004 | Reed | |
| 6,738,495 B2 | 5/2004 | Rhoads et al. | |
| 6,785,815 B1 | 8/2004 | Serret-Avila et al. | |
| 6,807,534 B1 | 10/2004 | Erickson | |
| 6,834,345 B2 | 12/2004 | Bloom et al. | |
| 6,868,403 B1 * | 3/2005 | Wiser et al. | 705/51 |
| 6,868,497 B1 | 3/2005 | Levy | |
| 6,920,567 B1 | 7/2005 | Doherty et al. | |
| 6,983,051 B1 | 1/2006 | Rhoads | |
| 7,035,427 B2 | 4/2006 | Rhoads | |
| 7,039,930 B1 * | 5/2006 | Goodman et al. | 725/22 |
| 7,047,241 B1 | 5/2006 | Erickson | |
| 7,076,084 B2 | 7/2006 | Davis et al. | |
| 7,095,871 B2 | 8/2006 | Jones et al. | |
| 7,127,744 B2 | 10/2006 | Levy | |
| 7,200,575 B2 * | 4/2007 | Hans et al. | 705/59 |
| 7,210,039 B2 | 4/2007 | Rodgers et al. | |
| 7,248,717 B2 | 7/2007 | Rhoads | |
| 7,362,879 B2 | 4/2008 | Evans et al. | |
| 7,372,976 B2 | 5/2008 | Rhoads et al. | |
| 7,398,556 B2 | 7/2008 | Erickson | |
| 7,426,750 B2 * | 9/2008 | Cooper et al. | 726/26 |
| 7,461,406 B2 | 12/2008 | Pelly et al. | |
| 7,466,823 B2 | 12/2008 | Vestergaard et al. | |
| 7,499,566 B2 | 3/2009 | Rhoads | |
| 7,509,421 B2 | 3/2009 | Lambert | |
| 2001/0029580 A1 | 10/2001 | Moskowitz | |
| 2001/0033674 A1 | 10/2001 | Chen et al. | |
| 2001/0047515 A1 * | 11/2001 | Schreer | 725/20 |
| 2002/0029338 A1 | 3/2002 | Bloom et al. | |
| 2002/0051560 A1 | 5/2002 | Donescu et al. | |
| 2002/0077988 A1 * | 6/2002 | Sasaki et al. | 705/59 |
| 2002/0087970 A1 * | 7/2002 | Dorricott et al. | 725/22 |
| 2002/0092019 A1 * | 7/2002 | Marcus | 725/37 |
| 2002/0112243 A1 * | 8/2002 | Hunter et al. | 725/92 |
| 2002/0120925 A1 * | 8/2002 | Logan | 725/9 |
| 2003/0105718 A1 * | 6/2003 | Hurtado et al. | 705/51 |
| 2004/0044627 A1 * | 3/2004 | Russell et al. | 705/50 |
| 2004/0091131 A1 | 5/2004 | Honsinger et al. | |
| 2004/0240846 A1 | 12/2004 | Cookson et al. | |

OTHER PUBLICATIONS

Voyatzis, G.; Pitas, I., "The use of watermarks in the protection of digital multimedia products," Proceedings of the IEEE, vol. 87, No. 7, pp. 1197-1207.*

Agent-based copyright protection architecture for online electronic publishing. Xun Yi, S. Kitazawa, Ejii Okamoto, Xiao F. Wang, KwokYan Lam, and S. Tu, Proc. SPIE 3657, 484 (1999), DOI:10.1117/12.344698.*

* cited by examiner

DIGITAL WATERMARKING APPLICATIONS

RELATED APPLICATION DATA

This application is a division of U.S. patent application Ser. No. 10/622,079, which claims the benefit of U.S. Provisional Patent Application No. 60/396,893, filed Jul. 16, 2002. These patent documents are hereby incorporated herein by reference.

TECHNICAL FIELD

The invention relates to digital watermarking, digital fingerprinting, and the use of such technology for copy protection, digital asset management, access control, authentication, content monitoring, and a variety of other applications.

BACKGROUND

Digital watermarking is a process for modifying physical or electronic media content to embed a hidden machine-readable code into the media. In digital watermarking, a media content signal, such as an image or audio signal, is modified to embed a hidden, digital auxiliary code signal such that the auxiliary signal is imperceptible or nearly imperceptible to the user, yet may be detected through an automated detection process. Most commonly, digital watermarking is applied to media content signals such as images, audio signals, and video signals. However, watermarking may also be applied to other types of media objects, including documents (e.g., through line, word or character shifting, through background patterns or tints, etc.), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed, e.g., in the assignee's co-pending U.S. patent application Ser. No. 09/503,881 and U.S. Pat. No. 6,122,403, which are each hereby incorporated by reference.

Another technology referred to as fingerprinting, in contrast to digital watermarking, does not embed auxiliary data in a media signal, but rather, derives a unique content signal identifier from the media signal itself. For some applications where the signal undergoes a transformation in normal use, such as compression, transmission, or digital to analog to digital conversion, the fingerprint (or host signal characteristics used to determined a fingerprint) preferably remains relatively unchanged, allowing unique identification of the content signal. Fingerprints for a wide selection of media signals may be stored in a database and associated with information or actions to be taken upon detection or calculation of a fingerprint.

DETAILED DESCRIPTION

Figure 1:
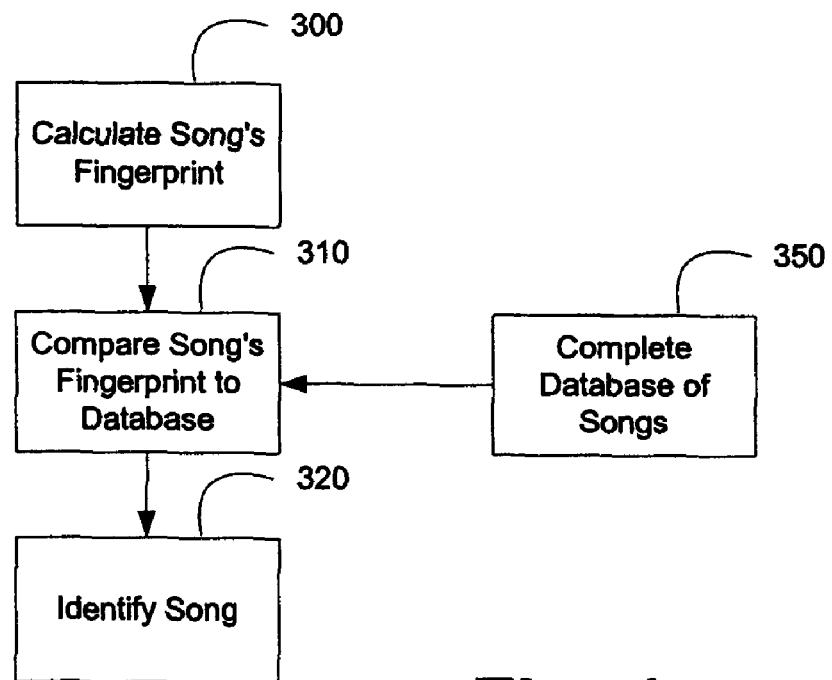
FIG. 1 shows a method of identifying songs with audio fingerprints.

Efficient Embedding of Location Information in Cameras in Combination with Cell Phones and GPS Units Background and Summary of Efficient Embedding of Location Information As background, we believe that digital asset management (DAM) systems will mature when the process of entering metadata about content managed in the system is mostly automated—as the searching capabilities are already pretty good and easy to use. Location information associated with media content, e.g., a geo-location of where an image was taken or locations depicted in the image, is a good example of such metadata. Other metadata may include, e.g., day, time, people depicted in an image, subject matter or descriptive words ("1998 Disneyland Trip"), events, authorship, copyright information, capture device particulars, etc., etc.

We believe that most DAM systems fail, when they do so, due to the time and effort needed to enter metadata into the system, not because the systems are too difficult to use.

We can simplify this effort. For example, it would be ideal if location information is automatically embedded in consumer images, automatically used to categorize images in DAM systems, and used when searching to find images from similar locations—thus, increasing the usage of the consumer based image DAM systems. This will allow consumers to search their images, as well as other's images assuming the consumer is part of an image sharing or subscription service, based upon location. (The file-sharing techniques and systems described in assignee's U.S. patent application Ser. No. 09/620,019, filed Jul. 20, 2000 and U.S. Published Patent Application No. US 2002-0052885 A1, which are each herein incorporated by reference, can be readily combined with these techniques.) For example, I can search based upon the geo-location of the Eiffel tower, and find all of my pictures and my friends pictures that were taken near the Eiffel tower—or even taken in France—by simply combining geographic maps of countries (or, e.g., embedded geographic indicators) and location search capabilities. (See, e.g., assignee's US Published Patent Application Nos. US 2002-0122564 A1; US 2002-0154144 A1; and US 2002-0124024 A1, and pending patent application Ser. Nos. 10/423,489 and 10/423,834 for related methods and systems. Each of these patent documents is herein incorporated by reference.).

To automatically embed location information from a camera into the picture, the camera preferably knows where it is located. A simplistic solution is to put a GPS detector in the camera, but this is often too expensive.

A preferred inventive method and system combines the function of cell phones and/or GPS units, which know where they are, with a camera via a physical or wireless link, so that the camera can inexpensively (e.g., without itself needing to include a GPS receiver) embed location data. In fact, the system can use a cell phone server so that the camera does not even require a GPS receiver.

In one implementation, position data is determined by a cell phone based on signals received from multiple cell sites (or towers), e.g., based on received cell site transmission strength and/or known cell site positions. (The location information is relayed (e.g., wirelessly) from the cell phone to the camera. Or the camera includes cell phone functionality, and communicates with the cell towers itself.). Alternatively, position data is relayed to the cell phone from a cell site. For example, multiple cell sites can compare respective reception times or received signals for a first transmission from the cell phone. A reception time differential is determined for the first transmission and is then used to determine a location for the cell phone based on known locations of the cell sites. Or cell phone transmissions as received by multiple cell sites, are compared to determine a position of the cell phone, as in triangulation methods. This position data is then communicated from a cell site (or tower) to cell phone. The communicated position data is optionally encrypted or otherwise scrambled to enhance security.

In another implementation, the camera communicates with a GPS receiver to receive location information.

Detailed Description of Efficient Embedding of Location Information

Embodiment 1

Location Based Upon Cell Phone Tower(s)

Currently, many cell phones are including still and/or video cameras. These cell phones can easily enable video conferencing with video cameras and image sharing with MMS (multimedia messaging services). A phone can also know where it is located within a cell network by having its signal strength as received at a plurality of cell towers calculated and/or compared (and/or a time delay of signal reception, especially with CDMA, or Code-Division Multiple Access as provided by Qualcomm Inc., where the system includes a master clock). In alternative position determining technique, one cell tower employs signal direction detection, such as a circular array of sensors with strength varying in the circle, to determine the location of a cell phone. This location information can be sent to the cell phone for embedding into the image or video frame. (See assigned U.S. Published Patent Application No. 2003-0040326 A1 for related details on determining a cell phone location. This patent document is herein incorporated by reference.). In other cases, a cell phone determines its location, perhaps by comparing signals received by multiple cell sites, or by using a timing scheme to measure signals. Alternatively, location information can be embedded by a network server into an image or other content, and then sent from a cell site to a cell phone during, e.g., multimedia messaging service (MMS) or video conferencing. In fact, an image can be uploaded to the server from a cell phone, embedded with the cell phone's location information, and then downloaded back to the phone, even if not used for MMS or video conferencing. This means that the cell phone/camera do not need to include a watermark embedder.

The embedding process can include watermarking or out of band methods, such as header tagging. The location of the cell phone and/or camera combination during the capture of the image can be redundantly embedded throughout the image, or more complex calculations can be done to embed the location of the image (or objects or areas depicted in an image) based upon the focal point of the camera, which includes a calculation including the cell phone/camera location, angle, focus length, and zoom, for example. Or, perhaps, only the location of the focal point of the center of the picture may be embedded, or the image can be broken into smaller section with each section containing local location information.

Embedding the complete location information in each section can embed the local (or area specific) location information. Alternatively, the local location information can be embedded by embedding the central location and differential change of the focal point (or cell phone camera combination location) into a group of sections, and each section in that group contains an embedded differential code. Thus, the location of that section can be calculated by adding the differential code times the differential change to the central location. This group may be part of a complete picture. The group may include a predetermined differential size, such that only the central location needs to be embedded in the group, along with each section having a differential code.

The cell phone and camera can be one device (as many cell phones now have cameras onboard) or separate, but physically (or wirelessly) connected devices. In either case, the connection, whether internal or external, between the cell phone and camera could be proprietary or based upon a standard such as USB or BlueTooth.

Location information can be shared between a cell phone and camera based upon using multimedia platforms, such as Qualcomm's BREW, or requiring a cell phone modification.

If a network server does the embedding, the cell phone preferably includes a control module (e.g., software or firmware) to help facilitate the cell phone to upload and then receive each embedded image. As such, this system requires minimal cost to implement.

Embodiment 2

Linking Camera and GPS

In a consumer device world which is moving from physically connected to wireless networking, such as via BlueTooth or IEEE 802.11b (a.k.a. WiFi), a camera and location device, such as cell phone or GPS unit, do not have to be physically connected. The camera and cell phone can act as described in embodiment 1 but via a wireless connection. Alternatively, a GPS unit with wireless capabilities can be used with the camera to provide location information.

As such, the consumer whom has a camera, and cell phone or GPS system, does not need to buy a combination. Thus, the consumer will not end up with a multitude of devices, or several GPS locators embedded within each device.

In some of the above embodiments, a server can determine a location and create bits to be embedded for a pre-determined image size. For pseudo-random noise (PN) watermarking techniques, this may include multiplying a watermark payload, including error correction, by the PN sequence, and including an orientation and synchronization signal, if applicable. The server can then download this watermark signal to a cell phone, which can, in turn, add it to the image or perform human visual modeling to reduce visibility of the watermark, preferably using an efficient human visual model. Of course, an image does not need to be uploaded, thus saving bandwidth and consumer expense, while the cell phone requires less CPU power to embed the watermark.

In addition, in both embodiments, a picture location can have time and biometrics added to determine where, when and who (e.g., who's depicted in the picture and who took the picture). The camera or server can identify people in the picture and who took the picture, via retinal or iris scanning in the eyepiece, fingerprint recognition in the shutter button, or face recognition using an image of the camera user. For a description of a capture device that captures biometrics of the user and embeds the biometric data in images, audio or video captured by the device, see e.g., U.S. patent application Ser. No. 09/585,678, which is herein incorporated by reference.

Watermarked Participant IDs Used for Proper Billing

Background and Summary for Participant IDs

In distribution of content, especially digital content, it is sometimes difficult to determine which parties require royalty payments. Audio royalties can be based upon the usage, such as whether the content is played on the radio, or as background music during a radio or TV show, etc. In addition, royalties include parties involved in both the performing and recording process (and can be extended to distribution and retail partners outside the area of copyright, as described below). There are often at least two copyrights associated with a particular piece of music, e.g., performance and recording. Video can be just as difficult, especially for ads where actors have to be properly compensated.

If a watermark in the content includes IDs for all parties that should receive royalties, the system of determining who to pay during distribution, especially digital file sharing, is made easier. Biometric analysis, such as facial or voice recognition may be used to identify people in images, video and audio to assist in determining appropriate parties to which royalties are due.

A similar problem occurs for content bought from a retailer (or distribution service provider acting as a retailer) that is allowed to be super or re-distributed by the consumer, such as content that is allowed to be shared on a file sharing system with a billing methodology. The retailer should be compensated, as well as copyright holders, whether or not, but optimally, if the file sharing system receives revenue from the content. For example, this can be audio shared on KazaA or VOD video shared with a SonicBlue Replay 4000™ PVR (where the retailer is the VOD service provider).

If the content includes a retailer (or distributor/VOD) ID, then the file sharing system can identify the original retailer and compensate them. The compensation can be per download, per rendering (e.g., per listening or viewing), or a percentage of royalty related to that song. More specifically, the retailer could be compensated with a percentage of revenue of the P2P provider related to the percentage of time that the retailer's song was downloaded. Similar royalties can relate to copyright owners, such as artists and record labels.

Detailed Description for Participant IDs

The digital watermarking system is a multi-step process (with each step sometimes having multiple sub-steps):

1. Each participant registers for a participant ID, and the ID is linked to the participant in a database (e.g., via a web based interface to a server or group of servers on the Internet or other computer network).
2. The content is embedded with the appropriate participant IDs.
3. The detection system reads the participant IDs, links to the database to interpret them, and enables the correct response or billing action.

Each participant preferably carries the first step out only once. The database can be centrally located with all participant IDs, centrally distributed, either mirrored or intelligently distributed, or local and updated (see, e.g., assignee's U.S. patent application Ser. No. 10/060,049 (published as US 2002-0162118 A1) and related PCT Application No. PCT/IUS02/02572 (published as WO 02/062009), each of which is herein incorporated by reference).

The second step needs to be only done once for each piece of content. The watermark can be chosen from a multitude of watermarking methods depending upon the content format, desired robustness, payload size, embedder and detector computational complexity, and perceptibility.

The third step is preferably performed each time the content goes through a transaction. For example, the third step may not have to occur during a download, if the song has limited functionality for evaluation, but should occur when the song is purchased or enabled for longer evaluation.

The third step may involve several sub-steps. For example, the participant ID is extracted from the content. Then, the database is used to link the participant ID to the participant. Next, an appropriate action is enabled.

The appropriate action may include a multitude of actions and related sub-steps. The appropriate action may be crediting an artist or retailer inside a P2P system or related billing system. The participant is paid, either each time content is transacted (e.g., a micro-payment) or as a larger transaction based upon the time from the last payment (e.g., pay every month) or the amount credited (e.g., pay when credit reaches $100).

The appropriate action may include logging the participant ID so that it can be submitted to a collection agency, such as BMI, ASCAP, and SESAC, and used by these agencies to determine how to distribute royalties. A record label, for promotion and demography research, may use the system. Or the system may be used to inter-participant trading value, such as within bartering systems.

Improved Broadcast Monitoring Based Upon Reduced Fingerprint Database Size

Background and Summary for Improved Broadcast Monitoring

Content fingerprints, which are methods to identify content based upon the content itself, typically use a database to perform some processing to match incoming fingerprint to fingerprints stored in the database. The larger the database, the more processing required by the database, and the less accurate the system.

Content fingerprinting methods can be used to monitor broadcasts, such as radio and TV. A dilemma is as follows. To monitor more stations, the system may need a large database of songs, which causes the system to be slower and less accurate. However, when monitoring fewer stations, the system is less economically attractive as a business because, once the fingerprinting system is developed and implemented, it is cheaper to monitor more stations as the only added cost is another radio receiver.

The novel solution is, for each station that is being monitored, the system only searches a database for content played on that station, such as songs played on that radio station during a predetermined period (e.g., a week, etc). The radio and TV stations have play lists that can be provided to the monitoring services.

Detailed Description for Improved Broadcast Monitoring

This system is applicable to radio and TV. The detailed example is shown for audio, since these systems have currently shown to be more practical. However, our inventive techniques can be applied to other types of content, such as video as well. (When considering video broadcast monitoring systems, or if audio fingerprinting systems are used to monitor TV stations, a TV play list will replaces a radio station song play list and the system works as described for radio broadcast monitoring.)

FIG. 1 shows a conventional method of identifying songs with fingerprints. Step 300 calculates the fingerprint for the song or section of the song.

Step 310 compares the calculated fingerprint to the database 350 and finds the closest match. This step may involve some type of distance calculation between the calculated fingerprints (sometimes including sub-fingerprints) and the database entries, which is computationally intensive and increases the likelihood of error as the database becomes larger. Even in fingerprint methods (potentially created in the future) that do not involve distance measurements, a larger database increases the likelihood of error. For example, if the fingerprint ID is erroneous due to background noise or a voice over, it is more likely to match a database ID in a larger database.

The third step involves identifying the song once the song's fingerprint is matched in the database.

Figure 2:
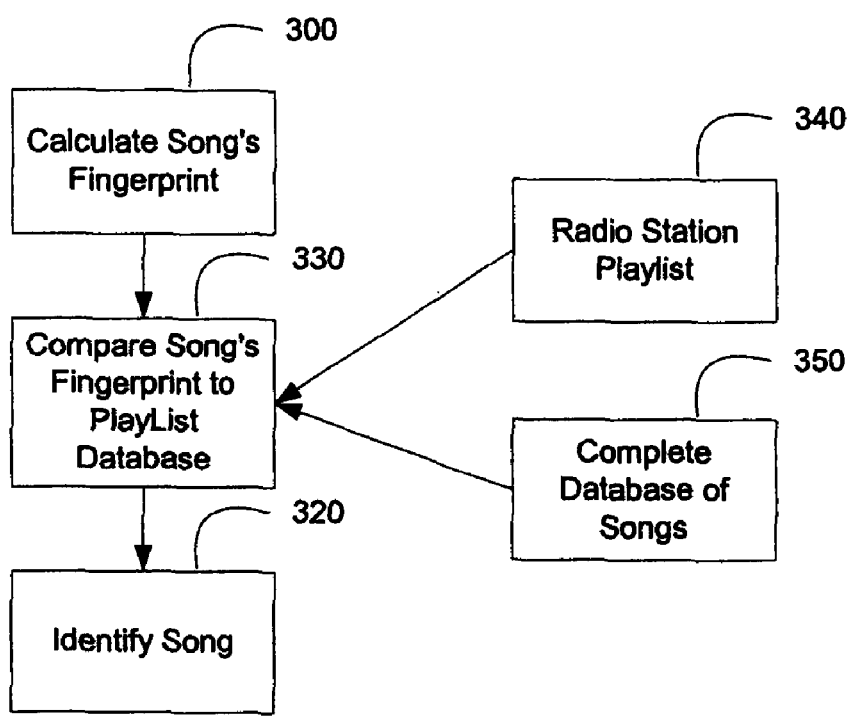
FIG. 2 shows an improved method of identifying songs with fingerprints.

FIG. 2 shows an inventive method of identifying songs with fingerprints, for systems such as radio monitoring, where a limited play list can be used to limit the database search space. The first step 300 is identical to the currently used method, where the song's fingerprint is calculated.

Step 330 includes comparing the song's fingerprint to a database (or data repository), which is limited to a play list of the radio station (or equivalent audio service, such as an Internet streaming system). The database used in step 330 is, e.g., preferably a selection of the songs from the radio station play list 340, which is a subset of the complete database 350.

The database used in step 330 may be local to the fingerprinting system, such as located on the same PC as calculating the fingerprint. The local database should be updated as the radio station play list changes. Alternatively, the database may be accessible via a network, such as the internet in a central database, or mirror or intelligently distributed database method. The intelligently distributed database method is an initial step of limiting number of database entries, where, for example, US songs not played in Europe do not exist in the versions of the database in Europe.

Wherever the database is located, the database can have only entries for songs included in the play list, or songs in the play list are highlighted as active. The latter means only the active entries are changed when the play list is updated, whereas the former means the database entries for newly added songs have to be added and database entries for songs in the database not included in the new play list have to be deleted.

The play list does not need to include times that the song is played, just a total list of every song played for a period of time, such as that week or month. The play list may have a likelihood or number of times each song is played to help the fingerprint system choose between two close matches.

As such, the song identification step 320 is now more accurate, and most likely more efficient, since the database used in step 330 is smaller than the database used in step 310.

Fair-Use Via Watermark Continuity Measurements
Background and Summary for Fair-Use Via Watermark Continuity Measurements United States Copyright law, as well as other copyright laws, such as in Europe and Asia, provide fair use safe harbors. Fair use usually enables certain people to use certain amounts of content without requiring to pay the copyright owner. For example, in the US, a teacher can use a short segment of a movie if certain fair use criteria are met.

In our digital world it is easy to obtain content and hard to determine fair use, so fair use is sometimes ignored. In addition, there are content security systems that are being built that violate fair use. As such, a technical method that enables calculation or determination of fair use is desirable.

One prior technique to provide fair-use is disclosed in U.S. Pat. No. 5,765,152 (Erickson), which is herein incorporated by reference. In one embodiment of the Erickson patent, media content is bundled in a container including minimum permissions (e.g., to allow fair use of the content). The media content can be handled only according to the minimum permissions.

My proposal, in contrast, uses a digital watermark embedded in content that is used to measure contiguous time the content is rendered or viewed. A playing or rendering system uses the measure to determine fair use, and can limit contiguous access to protected content within the system once the fair use limits have been exhausted.

Detailed Description for Fair-Use Via Watermark Continuity Measurements

Before content distribution, a watermark is embedded in the content with a payload including a static copy protection bit or bits, a static content ID, and dynamic counter or time reference indicator that can be used to determine the length of content. A rendering system used in locations requiring fair use, such as schools or research institutions, include a watermark detector to measures contiguous time that protected content is played. If the time is too long, or the content is used in a manner failing outside of fair use's boundaries, the rendering system stops working because fair use has been violated. The content ID is used to determine whether the play is contiguous and is not from different segments of protected content. (The protection bits can also be used to signal that the content is protected content. In some implementations, the copy protection bit(s) and the time interval indicator comprise the same payload bits. Of course, in other implementations, the copy protection bit(s) and the time interval indicator are separate payload fields.).

Micro-Payment Via Watermark Security Cards
Background and Summary for Micro-Payments In a secure payment system "Pay by Touch" by Indivos Inc. of Oakland, Calif., payments are made based upon a person's fingerprint (from a person's finger, not to be confused with a song's fingerprint as described above). The system involves a quick sign-up process, which includes the calculation and storage of the person's fingerprint. A checkout procedure involves a customer placing her finger on a touch pad at the checkout and entering a phone number or ZIP code. The reader compares the fingerprint scan to the images on file and calls up the appropriate account number. After the transaction authorization, the customer must also sign the sales slip.

This type of security can alternatively, and preferably, be provided via a secure driver's licenses or security card based upon digital watermarks. The watermarks authenticate the card originality as well as the picture as matching the card data. The debt could be accumulated and submitted every week or when it went above $100. By submitting larger amounts, the retailer can saves money in terms of fixed fees for credit card transactions, as well as being able to negotiate a lower rate due to an increased number of larger transactions. However, the retailer is assuming debt, and this amount can be based upon personal knowledge of the consumer (if legal) and/or past shopping history.

Detailed Description for Micro-Payment Improvements

Two processes are discussed: one for the creation of a customer card and one for the usage of the card at a point of sale.

Figure 3:
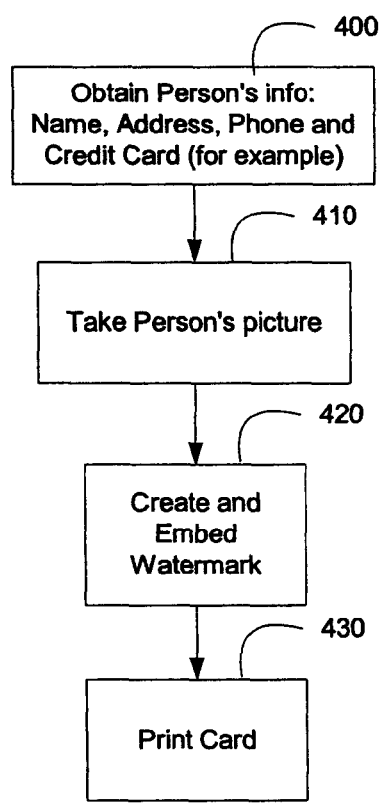
FIG. 3 shows a card creation process.

As shown in FIG. 3, the card creation process receives, in step 400, personal information from a customer. For example, a retailer can obtain the customer's name, address, phone number, and credit card or bank information. The personal information can be confirmed by a credit card company, as currently done with many currently used systems, such as when ordering on the Internet.

Step 410 includes obtaining the person's picture. The picture can be directly captured (e.g., via a digital camera) or obtained from a photographic repository.

Step 420 includes creating and embedding a digital watermark. A robust watermark to be embedded in the customer picture is preferably based upon the personal information; that is, a digital watermark payload is created and embedded in the picture that somehow links the picture to the information on the card or to information provided by the customer. The payload may include, for example, a 20-bit MD5 hash of the name, address and phone number. The likelihood that these 20 bits are not unique for people who look similar is low enough to provide adequate security. In addition, within the picture or background of the card, a fragile watermark can be added that can identify whether the card is original or a copy.

The card is printed in step 430. Most any printer can be used as most printers usually have minimal effects on watermarks, but the most secure system will include a list of recommended card printers. This list will include printers that most accurately represent the watermarks on the card.

Figure 4:
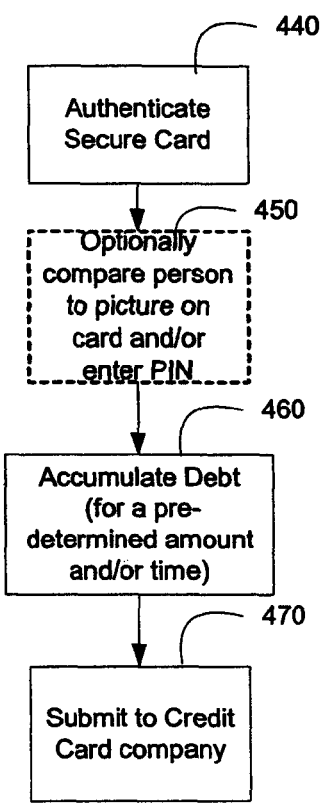
FIG. 4 shows a card usage process.

As shown in FIG. 4, the card usage process is employed, e.g., in step 440, where, at a checkout, a card reader authenticates the card. The card reader may be part of a kiosk with a window to place the card, may be a stand alone or tethered hand-held reader, or a device that the card is slid into and pulled out or automatically returned (i.e. a automatic scanner). Typically, the reader will include an optical sensor to capture optical scan data representing the card or a portion of the card (e.g., the picture). A digital watermark decoder analyses the scan data to decode the watermark and obtain the watermark payload.

If the reader is part of a kiosk, the kiosk system may also be used to help link the user to previous buying habits and pricing. For example, the user may be able to look up how much they paid for milk a month ago, as well as how much milk they have bought in the last month. In addition, they may be able to look up warranty information for products bought at a store via the kiosk. Similarly, if the store allows online browsing, the kiosk can link to the online shopping. For example, the kiosk can link to a wish created while shopping online. This linking is facilitated, at least in part, by the decoded digital watermark. For example, the payload includes an identifier—perhaps a hash of a customer's personal information—which is used to link to information regarding the customer. (See, e.g., assignee's U.S. patent application Ser. No. 09/571,422, filed May 15, 2000, which is herein incorporated by reference, for additional watermark-based linking techniques.)

Since the ID created from the hash may not be entirely unique and the kiosk system may sometimes need a unique ID for each user, a PIN and/or person's name can be used to guarantee that the ID is unique. Alternatively, a separate unique ID can be added to the image or background of the card based upon a central registration process during the creation of the card to obtain the unique ID.

In step 450, a store employee can optionally look at the card and holder to make sure the picture matches the person. Optionally, in addition to or instead of comparing the picture to the person, a PIN (personal identification number) or biometric sample can be entered. The ideal security system involves something you have (i.e. ID card), something you are (e.g., biometric sample like a fingerprint, voice print, retinal scan, etc.), and something you know (e.g., PIN or sequence). The card is something you have. Comparing the picture (or biometric) to the card user is something you are, and requiring a PIN requires something you know. Thus, if both optional steps are included, where each step involves minimal cost, the system is more secure than just requiring a card or fingerprint.

In step 460, the retailer adds the price of the purchase to an account or data record associated with the customer, thus accumulating the customer's debt. The retailer can accumulate debt for a pre-determined amount of time and/or up to a pre-determined amount. The pre-determined amount can be dependent, e.g., upon a customer's past history of shopping at the store, her credit history, or her personal relationship with the retailer (subject, of course, to any applicable laws). Pre-determined amounts can change over time, dependent upon the customer's usage patterns and how quickly she pays the store or her account.

As such, the retailer is accumulating risk, balanced by saving expenses by dealing with many small transactions with credit card companies or banks. For example, a user may disappear and cancel a credit card before the retailer bills the credit card—which leaves the retailer out of money.

The pre-determined amounts can work similar to how credit cards increase a credit limit over time. For example, for the first 6 months, the system may submit every week or when an account reaches $50, which ever is first. Then, assuming the person continues spending money and paying their debt, the values can be increased to 10 days and $75, and so on.

At the correct time in step 470, based upon the previously described rules, the debt is submitted to the credit card company or other financial institution.

Alternatively, rather than using a credit card company, the debt could be billed to the user directly, or highlighted for the next time the user arrives for payment (especially if the retailer is part of a user's club or co-op where the user visits regularly).

This system saves the most money for retailers that have repeat customers who spend minimal amounts each visit, such as for a neighborhood market or convenience store, or hardware store.

This system can also be used with an Internet online retailer, since a PC and camera can securely read a watermarked card. In fact, the pre-determined amounts can be updated by ratings of the Internet site from other user if the system involves trading, such as for Web sites like eBay.com.

This system could also use a driver's license, when the driver's license has digital watermarks authenticating the card, instead of a proprietary store card. Similarly, instead of the card, the fingerprint can be used with the described debt accumulation system. The fingerprint can potentially along with the PIN, signature and/or even a security card with a watermark or magnetic strip (for something you have), could be used with the method for accumulating micro-payments. In this system, the fingerprint and signature (if included) are something you are, the PIN (if included) is something you know, and security card (if included) is something you have. Thus, if the optional parts are required, the system has maximum security.

Digimarc Mediabridge Enabled Physical Internet Access Logon Cards

Background and Summary for Access Logon Cards

Many Internet cafés and hotels with wireless networks and/or central Internet-ready PCs use passwords to stop unauthorized people from using an Internet link, as well as to track usage. However, it is easy for users to share the passwords, as well as it is expensive to maintain because the system requires a hotel to change, remember, and provide the current password.

A logon card including a digital watermark embedded therein that can be read by a PC optical camera, can enable Internet access in computers with cameras. One type of watermarking scheme is provided by Digimarc's (Tualatin, Oreg., USA) MediaBridge™ technology. Our logon cards are more secure than passwords since when people share them, a copy is not made. These logon cards are more efficient than passwords because they don't need to be changed since they cannot be duplicated. The logon card can be combined with existing cards, such as with modern plastic hotel room keys (that use a magnetic strip to open the door) or with personal membership cards. This combination reduces cost because several cards don't have to be created and monitored for loss.

Detailed Description for Access Logon Cards

Detailed examples involving a hotel and Internet café are one efficient way to explain this system.

For a hotel with a magnetically coded room keys, if every room key is pre-watermarked with a unique ID, when the key is given to the user and coded for their room, the watermark ID can be linked to the room. Then, if the consumer wants to use a computer in the business center of the hotel, for example, rather than requiring a password, the user shows his/her watermarked room key to the web camera on the PC in the business center, and the computer is unlocked so the consumer can use it. Since the room key is linked to the room, the computer usage can be automatically billed to the user's room.

Similarly, our logon card system can be employed for consumers to use a wireless network—which works as follows. A user shows there watermarked room key to a wireless access terminal. The access terminal captures an image of the room key, decodes the watermark from captured image, check to see if the ID is valid (e.g., ensuring the that user is a current quest at the hotel), and then enables wireless access, if the ID iv valid. (The hotel or affiliated provider can maintain a database of unique ID. IDs can be flagged valid or invalid, or even removed from the database if they have expired.) Thus, consumers with wireless network cards do not need encryption codes that can easily be shared and hard to find at the front desk to use the hotel's wireless network internet connection, they only need a PC with a camera. In turn, the hotel doesn't need to maintain the encryption system.

Once again, the system can automatically bill usage to the user's room since the watermark is linked to the hotel room, even though the consumer can work as they wonder throughout the hotel (e.g., not locked in their room or a hotel business center).

This system can also work for in-room wired networks. Although, the room number can be known in this case due to the physical wire connected to the room, if the hotel is controlling the PCs in its business center and wireless network with the room key, it may be advantageous to have all the systems work identically. In addition, with our logon card system, the rooms can be wired with standard ethernet capabilities, where the physical wires don't have to be linked to a room (and the PC doesn't have to be identified so several people don't share a connection in one room).

In an Internet café example, a logon card given to the consumer when they are ready to use a PC controls login. The logon card is shown to a camera on the PC to log them on, as described for the PCs in the hotel's business center. The usage can be timed on the PC that the consumer is using (as identified by a watermark ID on the logon card), or by a master PC, which determines when the logon card was given to the consumer and when returned (by showing it to the master PC's camera when given and received). With either billing method, even if the consumer shares the logon card, they are still billed since it can identify them.

In addition, if an Internet café wants to have a membership card, where a consumer gets 5 free hours with every 20 hours used, for example, the membership card can be watermarked with a unique ID that is used to log onto the computer and link to the member. The card can also have security measures, if desired, such as fragile watermarks to locate copies and watermarks that link the picture to the personal data (via embedding a 20 bit hash of the user's name, for example). The fragile watermark degrades when a reproduction of the originally watermarked item is made, enabling a watermark reader to differentiate reproductions from an original, watermarked object.

The system level details include that after the card is shown to the PC with the camera, the watermark ID is sent to a database that links the ID to a room number and identifies that the ID is active. If the ID is active, the consumer is allowed to logon, and the appropriate billing action is started. If the ID is not active, the logon is not allowed. They system should be secured by authenticating the card reading software to the database, and encrypting the watermark ID when sent within the PC or network. Session keys should be changed to be resistant to replay attack, as well known in the art of cryptography.

In the Internet café system, which uses a master PC to monitor the amount of time the card is checked-out, the PC that the consumer uses only needs to verify that the watermark ID is active or authentic to enable logon.

See, e.g., assignee's U.S. patent application Ser. Nos. 10/382,359 and 09/571,422, which are each herein incorporated by reference, for related techniques and/or environments.

Surveillance Video Authentication

Background and Summary for Surveillance Video Authentication

Authentication of surveillance video, such as that captured by closed circuit TV (CCTV), is important to verify in court that the surveillance video is authentic. The Digital Signature Standard (DSS), or any digital signature (by definition, including the private key encryption of a robust hash), can be used to authenticate the accuracy of every bit in each frame of surveillance video. The unique combination of private key usage, frame splitting and date-time addition can improve the authentication to guarantee that no frames were removed, that the frames were recorded at the appropriate date and time, and that the appropriate recorder performed the recording. Location information can also be embedded in the video in the form of a digital watermark to improve authentication.

Detailed Description for Surveillance Video Authentication

The DSS, as described in Spec "Federal Information Processing Standard (FIPS186) Digital Signature Standard (DSS)" available at <http://www.itl.nist.gov/fipspubs/fip186.htm> and uses the secure hash algorithm (SHA-1) as described at <http://www.itl.nist.gov/fipspubs/fip180-1.htm>, or any other digital signature based upon a robust hash and public key cryptography, is used to demonstrate that no bits in each frame have been modified. The signature for each frame is saved as a signature frame in a separate file or part of the video header, with the whole signature saved in the video header or each signature frame saved in each corresponding video frame's header. The system also demonstrates that no frames have been added because the correct signature cannot be calculated.

As an alternative and inventive option, the system can use half of one frame and the other half of the next frame in the signature for each frame. This system demonstrates that every bit of each frame is authentic and that no frames have been added (as before, as well as the fact that no frames have been removed). The additional authentication that no frames have been removed is based on the fact that each frame signature includes bits from itself and another frame; thus, if any frame is removed the previous frame's signature will not match. This system can be designed in many ways, such as using thirds of a frame, the previous frame and the next frame, as long as every bit of each frame is included somewhere in the signature and one frame is not completely included in one signature frame. The signature frames can be saved in a separate file, as part of the video header, or as part of each frame header.

Alternatively, the complete group of signature frames can be encrypted with the private key to make sure no frames are removed. Similarly, the system, for a fixed video, could consider all the frames as one large message, and perform a DSS on the complete message, as long as the message length does not exceed the limit set by the digital signature.

Additionally, the date and time (and/or geo-location associated with the video or area depicted in the video) can be included as part of the frame signature to verify the date and time (and/or location) of the video. The date time (and/or location) can be added to the robust hash calculation (by converting the date time stamp to bits and included as any additional frame bits) or appending the date time stamp to the robust hash payload and then encrypted with the private key. The date time stamp can have frame or second accuracy (or maybe even minute accuracy).

Furthermore, each video recorder can share a system-level private key or have its owner recorder private key. If separate recorder private keys are used, the system can track the machine from which the video was recorded based upon the one-to-one relationship of the decryption public key and encryption private key. More specifically, as well known, if the wrong public key is used, the authentication process will fail; thus, the public key identifies the private key used, which, in turn, identifies the machine.

As discussed in the DSS or well known in the state of art for cryptography and digital signatures, the authentication process includes using the public key to decrypt the digital signature and compare it to the robust hash calculation of the video frame data (and possibly date and time, if included as part of the hash and not a separate part of the payload). If they match, the video frame data is authentic. If the date time stamp is included as an appended part of the robust hash payload, the date time stamp can be read from the digital signature to verify the date and time.

As such, if every additional option is used, every bit of the video is shown to be authentic, meaning that no bits have not been modified, removed or added. In addition, the date and time of the video is known. Finally, the recorder can be identified based upon the public decryption key.

Alternatively, the RSA algorithm, rather than DSA algorithm can be chosen to make the authentication (referred to as verification in the referred web page) process faster than the signing process, but this is probably not advantageous for this system since the signing must be done in real time on the recorder and the authentication can be done offline.

Furthermore, small segments (like 128×128 pixels) of each frame can be used, with some segment overlapping between frames. This has the advantage of demonstrating the location of any manipulation, as well as linking frames together, so frames cannot be removed. The digital signature for each segment within each frame and for each segment started within the frame (and including some of the next or other frame), can be stored in the header of that frame or as a group of frames, and one needs to include a date time stamp. In other words, the frame digital signature consists of many smaller signatures, and includes a date time stamp.

The digital signatures could be included in reversible watermarks within the frame content for each frame segment, rather in header data. A reversible watermark is generally a watermark, which can be removed from content without degrading (or without significantly degrading) the content. In some cases, removing a watermark implies restoring content to its unmarked state. Suitable reversible watermarks are described, e.g., in assignee's pending U.S. patent application Ser. Nos. 10/319,404, filed Dec. 12, 2002 and 10/435,517, filed May 8, 2003, which are each hereby incorporated by reference.

Concluding Remarks

Having described and illustrated the principles of the technology with reference to specific implementations, it will be recognized that the technology can be implemented in many other, different, forms.

To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding and fingerprint calculation may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method for providing royalty payments for content distributed via a network, said method comprising:
    receiving registration information from a participant who requires royalty payments for content to be distributed;
    assigning a unique identifier to the participant;
    steganographically embedding the content with the identifier; and
    associating a royalty payment action with the identifier in a data repository;
    in which the royalty payment action is initiated when a rendering device decodes the steganographic embedding and obtains the identifier during a transaction, the identifier being provided to the data repository and, in response to receiving the identifier, performing the royalty payment action, in which said performing the royalty payment action does not occur when the content includes limited functionality for initial evaluation prior to a purchase or licensing transaction but said performing the royalty payment action does occur when the content is purchased or enabled for longer evaluation relative to the initial evaluation;
    wherein the royalty payment action comprises determining a percentage of revenue that corresponds to an amount of times the content undergoes a transaction.

2. The method of claim 1 wherein the network comprises a peer-to-peer file-sharing network.

3. A non-transitory computer readable medium comprising instructions stored thereon to cause one or more electronic processors to perform the method of claim 1.

4. A non-transitory computer readable medium comprising instructions stored thereon to cause one or more electronic processors to perform the method of claim 2.

5. A method comprising:
    receiving registration information corresponding to audio or video content prior to distribution of the audio or video content;
    assigning an identifier to the audio or video content or to a participant associated with the audio or video content;

utilizing an electronic processor configured to embed the identifier in the audio or video content with digital watermarking, wherein the digital watermarking alters data representing the audio elements or video picture elements of the audio or video content to hide the identifier therein;

maintaining the identifier in a data repository;

distributing embedded audio or video content;

and determining revenue attributable to an amount of times the audio or video content undergoes a transaction by utilizing at least the identifier, in which said determining does not occur with content having limited functionality for initial evaluation prior to a purchase or licensing transaction but said determining does occur with content purchased or enabled for longer evaluation relative to the initial evaluation;

wherein said act of determining determines a percentage of revenue that is attributable to an amount of times the audio or video content undergoes a transaction by utilizing at least the identifier.

6. A non-transitory computer readable medium comprising instructions stored thereon to cause one or more electronic processors to perform the method of claim 5.

7. A non-transitory computer readable medium comprising instructions stored thereon to cause one or more electronic processors to perform the method of claim 5.

8. A programmed computing system storing instructions in memory, said instructions are executable by said programmed computing system to perform the acts of claim 1.

9. A programmed computing system storing instructions in memory, said instructions are executable by said programmed computing system to perform the acts of claim 5.

10. An apparatus comprising:

electronic memory for buffering registration information from a participant who requires royalty payments for content to be distributed;

and an electronic processor programmed for:

assigning a unique identifier to the participant;

steganographically embedding the content with the unique identifier; and associating a royalty payment action with the identifier in a data repository, in which the royalty payment action is initiated when a rendering device decodes the steganographic embedding and obtains the identifier during a transaction, the identifier being provided via a network to the data repository, and, in response to receiving the identifier, performing the royalty payment action, and in which said performing the royalty payment action does not occur when the content includes limited functionality for initial evaluation prior to a purchase or licensing transaction but said royalty payment action does occur when the content is purchased or enabled for longer evaluation relative to the initial evaluation;

in which the royalty payment action comprises determining a percentage of revenue that corresponds to an amount of times the content undergoes a transaction.

11. The apparatus of claim 10 wherein the network comprises a peer-to-peer file-sharing network.

12. The apparatus of claim 10 in which said electronic processor is operating to perform at least one of the functions recited therein.

13. An apparatus comprising:

electronic memory for buffering registration information corresponding to audio or video content prior to distribution of the audio or video content; and an electronic processor programmed for:

assigning an identifier to the audio or video content or to a participant associated with the audio or video content;

embedding the identifier in the audio or video content with digital watermarking, in which the digital watermarking alters data representing audio elements or video picture elements of the audio or video content to hide the identifier therein;

maintaining the identifier in a data repository;

distributing embedded audio or video content; and determining revenue attributable to an amount of times the audio or video content undergoes a transaction by utilizing at least the identifier, in which the determining does not occur with content having limited functionality for initial evaluation prior to a purchase or licensing transaction but the determining does occur with content purchased or enabled for longer evaluation relative to the initial evaluation;

in which said determining determines a percentage of revenue that is attributable to an amount of times the audio or video content undergoes a transaction by utilizing at least the identifier.

14. The apparatus of claim 13 in which said electronic processor is operating to perform at least one of the functions recited therein.

* * * * *